US012394273B2

(12) United States Patent
Huke et al.

(10) Patent No.: US 12,394,273 B2
(45) Date of Patent: *Aug. 19, 2025

(54) LIVE EVENT RECORDING METHOD AND SYSTEM

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US); Harrison Grant, Anaheim, CA (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,801

(22) Filed: Nov. 29, 2023

(65) Prior Publication Data

US 2024/0096162 A1 Mar. 21, 2024

Related U.S. Application Data

(63) Continuation of application No. 17/385,001, filed on Jul. 26, 2021, now Pat. No. 11,847,883, which is a continuation of application No. 17/088,889, filed on Nov. 4, 2020, now Pat. No. 11,100,747.

(60) Provisional application No. 63/092,637, filed on Oct. 16, 2020, provisional application No. 63/082,736, filed on Sep. 24, 2020.

(51) Int. Cl.
*G07F 17/32* (2006.01)

(52) U.S. Cl.
CPC ...... *G07F 17/3211* (2013.01); *G07F 17/3223* (2013.01); *G07F 17/3288* (2013.01)

(58) Field of Classification Search
None
See application file for complete search history.

(56) References Cited

U.S. PATENT DOCUMENTS

| | | | | |
|---|---|---|---|---|
| 7,648,414 | B2 | 1/2010 | McNutt et al. | |
| 8,808,549 | B2 | 8/2014 | Kolb | |
| 9,367,987 | B1 | 6/2016 | Brunell | |
| 11,100,747 | B1 | 8/2021 | Huke et al. | |
| 2008/0182651 | A1 | 7/2008 | Marshall et al. | |
| 2017/0140611 | A1 | 5/2017 | Marantelli | |
| 2018/0005492 | A1* | 1/2018 | Hall | G07F 17/323 |
| 2018/0190077 | A1* | 7/2018 | Hall | G07F 17/3288 |
| 2018/0221769 | A1 | 8/2018 | Kosai et al. | |
| 2019/0122500 | A1 | 4/2019 | Joao | |
| 2019/0158787 | A1 | 5/2019 | Pino, Jr. et al. | |
| 2019/0244485 | A1* | 8/2019 | Jones | G07F 17/3274 |
| 2020/0035065 | A1 | 1/2020 | Ellis et al. | |
| 2020/0250918 | A1 | 8/2020 | Joao | |
| 2020/0410820 | A1 | 12/2020 | Ellis et al. | |
| 2021/0248645 | A1* | 8/2021 | Huke | G06Q 30/0269 |
| 2021/0248707 | A1* | 8/2021 | Huke | G07F 17/323 |

* cited by examiner

*Primary Examiner* — Ronald Laneau
(74) *Attorney, Agent, or Firm* — Maier & Maier, PLLC

(57) ABSTRACT

Methods and systems for determining and providing automatic flags for what is classified as a "significant" bet. When the user makes a significant bet, a software application automatically records the play and may also record the user's reaction. The user does not have to provide an indication to record these clips.

9 Claims, 3 Drawing Sheets

Content - High Level Diagram

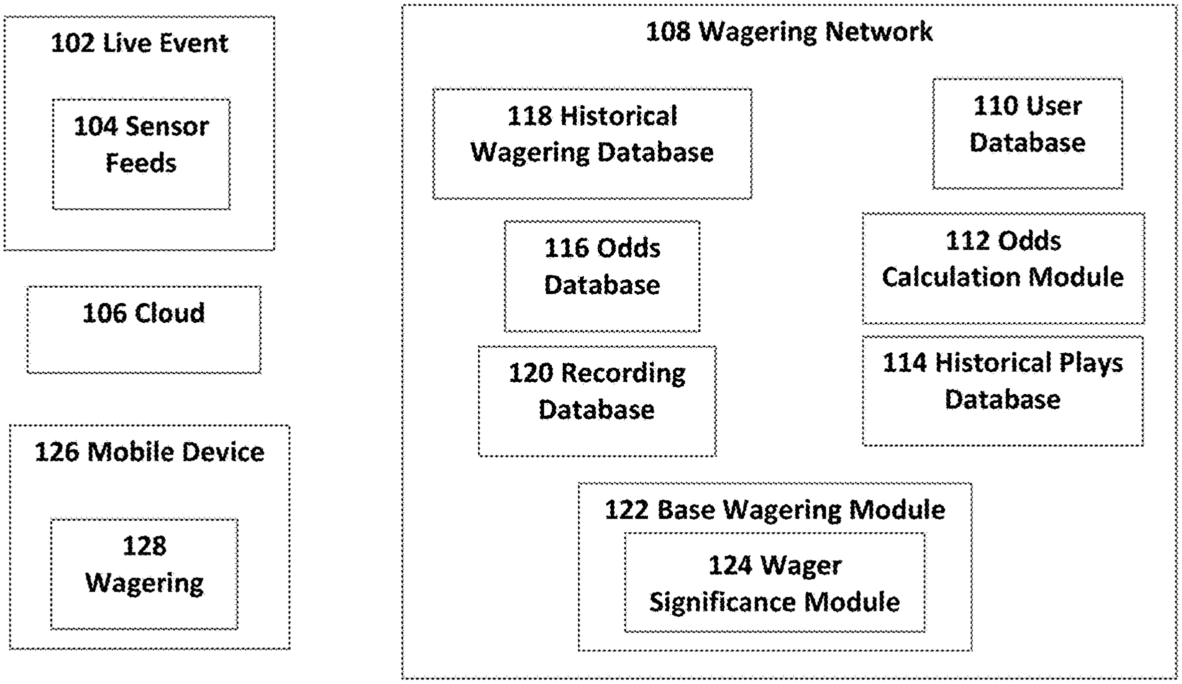
Fig.1 Content - High Level Diagram
| User ID | Live Game ID | Wager | Wager | Wager | Date and Time |
|---|---|---|---|---|---|
| bmarcus | 2208072020 | 12 | $20 | win | 8:49 PM 9/17/2020 |
| footballfan87 | SUPER_BOWL_LIV | 67 | $18 | loss | 5:37 PM 2/2/2020 |
| betsbytrey | 1109222020 | 3 | $500 | win | 7:22 PM 9/22/2020 |
| - | - | - | - | - | - |
| - | - | - | - | - | - |
Fig.2 Historical Wagering Database Data Content
| Recording File | historic wagering database |
|---|---|
| 4893748508.MP4 | 13688 |
| 4736749374.MP4 | 11847 |
| 2003948751.MP4 | 4387 |
| - | - |
| - | - |
Fig.3 Recording Database Data Content

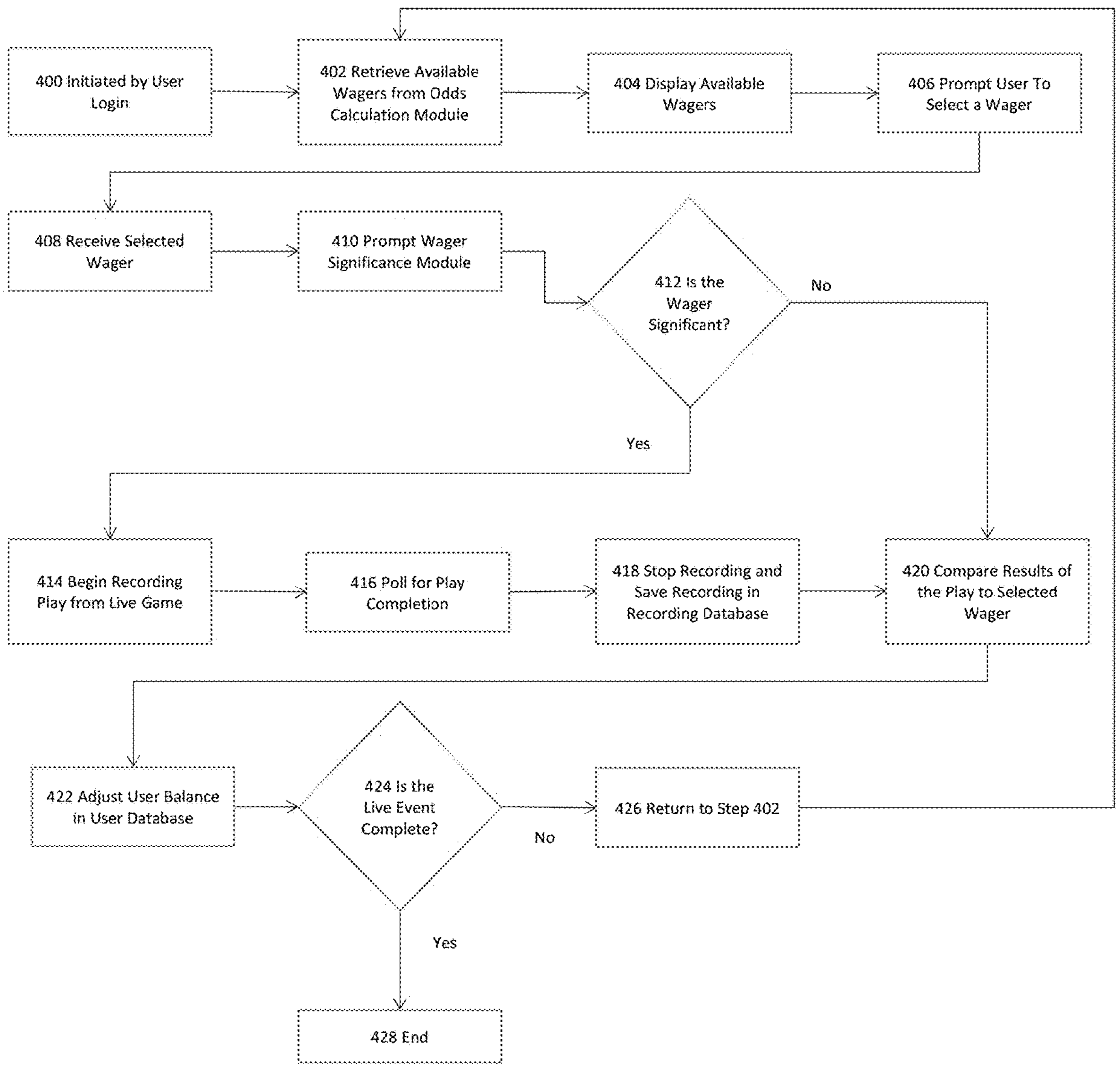
Fig.4 Base Wagering Module Object Content

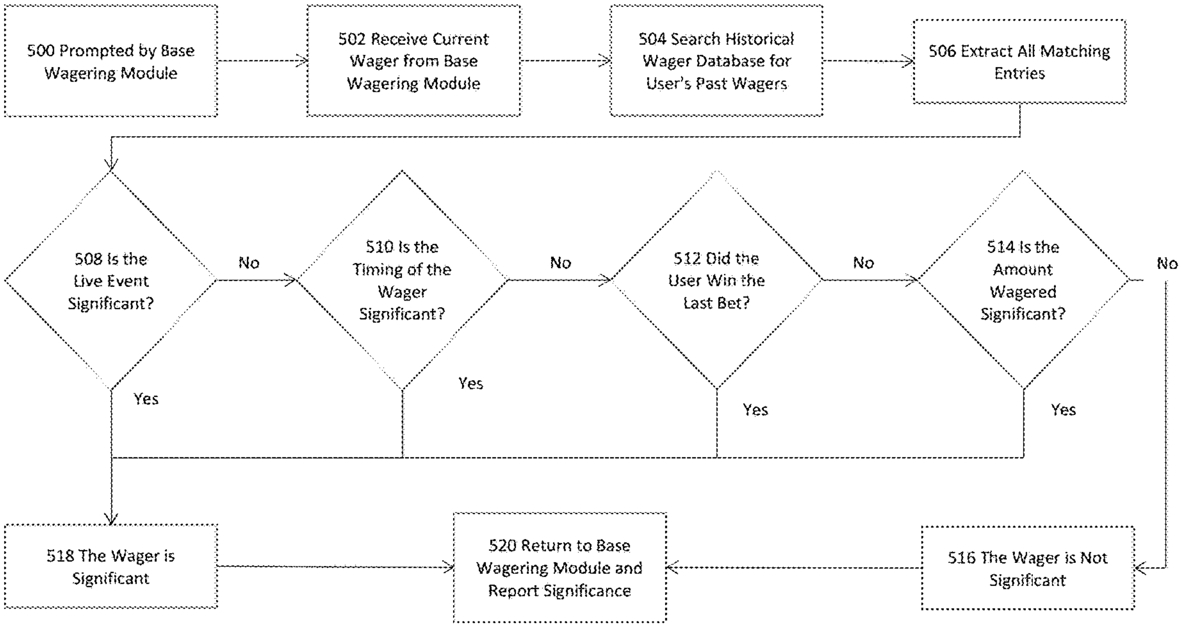
Fig.5 Wager Significance Module Object Content

LIVE EVENT RECORDING METHOD AND SYSTEM

CROSS-REFERENCE TO RELATED APPLICATIONS

This application is Continuation of U.S. patent application Ser. No. 17/385,001, filed on Jul. 26, 2021, which is a Continuation of U.S. patent application Ser. No. 17/088,889, filed on Nov. 4, 2020 (now U.S. Pat. No. 11,100,747), which claims the benefit of priority of U.S. Provisional Patent Application No. 63/082,736, filed on Sep. 24, 2020, and U.S. Provisional Patent Application No. 63/092,637, filed on Oct. 16, 2020, the contents of which are incorporated herein by reference in its entirety.

FIELD

The embodiments are generally related to play by play wagering on live sporting events and recording plays of significance.

BACKGROUND

The prevalence of social media has made the capturing of significant or exciting events important to many people. The spread of sports wagering that has accompanied the Supreme Court's ruling on the Professional and Amateur Sports Protection Act is going to create a number of opportunities for exciting wagering experiences. To capture these experiences users currently need to capture the experience in real time, taking time and focus away from both their wagering experience and their experience of the live sporting event they are wagering on. The user may want to capture information from the live event, the wagering platform and their own experience, in order to memorialize the experience. To capture all this data efficiently would require significant resources from the user.

Current sports betting platforms provide numerous different ways to wager on entire sporting events, or individual aspects or portions those events. Betting on portions of events, or micro-betting, has become more accessible due to advancements in technology. However, as with the emergence of any new market that branches off from an existing market, micro-betting comes with new opportunities and problems that betting on an entire sporting event did not have. One problem is that it may be difficult to communicate with others which portion f an event a person successfully wagered on. Especially when there are multiple portions of the event that can be described the same way, for example in football a conversion on 3rd and 10 during the first quarter may describe more than one play. Further, a bettor may have a net gain over the course of an event but may no remember exactly what they wagered on each individual portion of the event that lead to that et gain.

SUMMARY

Embodiments include methods, systems and apparatuses for live event recordings in a real time single play wagering platform. One embodiment includes a system for recording video related to a play of significance in a live sporting event when a wager is placed on a play by play wagering platform, including a connection to a live sporting event upon which wagers can be placed on plays in a wagering game, a database storing wager history, a database storing video, a wager significance module that determines whether a wager on a play is significant based on the wager history and context of the play, and a video generated if the wager is determined to be significant.

Another embodiment includes a method of displaying recordings related plays in a live sporting event when a wager is placed on a play by play wagering platform, including executing on a processor the steps of displaying a wagering platform; displaying one or more live sporting events upon which a wagers can be placed play by play in real time; displaying one or more wager options; and displaying indicia that a video is made after selection of a wager.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 illustrates a wagering system, according to an embodiment.

FIG. 2 illustrates a historical wagering database, according to an embodiment.

FIG. 3 illustrates a recording database, according to an embodiment.

FIG. 4 illustrates a base wagering module, according to an embodiment.

FIG. 5 illustrates a wager significance module, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. “eSports” refers to a form of sports competition using video games, or a multiplayer video game played competitively for spectators, typically by professional gamers. Digital gaming and “eSports” can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The “total” is the combined number of runs, points or goals scored by both teams during the game, including overtime. The “over” refers to a sports bet in which the player wagers that the combined point total of two teams will be more than a specified total. The “under” refers to bets that the total points scored by two teams will be less than a certain figure. “Total”, “over”, and “under” can be integrated into the embodiments in a variety of manners.

A “parlay” is a single bet that links together two or more wagers; to win the bet, the player must win all the wagers in the “parlay”. If the player loses one wager, the player loses the entire bet. However, if he wins all the wagers in the “parlay”, the player wins a higher payoff than if the player had placed the bets separately. A “round robin” is a series of parlays. A “teaser” is a type of parlay in which the point spread, or total of each individual play is adjusted. The price of moving the point spread (teasing) is lower payoff odds on winning wagers. “Parlay”, “round robin”, “teaser” can be integrated into the embodiments in a variety of manners.

A “prop bet” or “proposition bet” means a bet that focuses on the outcome of events within a given game. Props are often offered on marquee games of great interest. These include Sunday and Monday night pro football games, various high-profile college football games, major college bowl games and playoff and championship games. An example of a prop bet is “Which team will score the first touchdown?” “Prop bet” or “proposition bet” can be integrated into the embodiments in a variety of manners.

A “first-half bet” refers to a bet placed on the score in the first half of the event only and only considers the first half of the game or event. The process in which you go about placing this bet is the same process that you would use to place a full game bet, but as previously mentioned, only the first half is important to a first-half bet type of wager. A “half-time bet” refers to a bet placed on scoring in the second half of a game or event only. “First-half-bet” and “half-time-bet” can be integrated into the embodiments in a variety of manners.

A “futures bet” or “future” refers to the odds that are posted well in advance on the winner of major events, typical future bets are the Pro Football Championship, Collegiate Football Championship, the Pro Basketball Championship, the Collegiate Basketball Championship, and the Pro Baseball Championship. “Futures bet” or “future” can be integrated into the embodiments in a variety of manners.

The “listed pitchers” is specific to a baseball bet placed only if both of the pitchers scheduled to start a game actually start. If they don’t, the bet is deemed “no action” and refunded. The “run line” in baseball, refers to a spread used instead of the money line. “Listed pitchers” and “no action” and “run line” can be integrated into the embodiments in a variety of manners.

The term “handle” refers to the total amount of bets taken. The term “hold” refers to the percentage the house wins. The term “juice” refers to the bookmaker’s commission, most commonly the 11 to 10 bettors lay on straight point spread wagers: also known as “vigorish” or “vig”. The “limit” refers to the maximum amount accepted by the house before the odds and/or point spread are changed. “Off the board” refers to a game in which no bets are being accepted. “Handle”, “juice”, vigorish”, “vig” and “off the board” can be integrated into the embodiments in a variety of manners.

“Casinos” are a public room or building where gambling games are played. “Racino” is a building complex or grounds having a racetrack and gambling facilities for playing slot machines, blackjack, roulette, etc. “Casino” and “Racino” can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for wagering. This system may include a live event 102, for example a sporting event such as a football game, basketball game, baseball game, hockey game, tennis match, golf tournament, eSports or digital game, etc. The live event 102 will include some number of actions or plays, upon with a user or bettor or customer can place a bet or wager, typically through an entity called a sportsbook. There are numerous types of wagers the bettor can make, including, a straight bet, a money line bet, a bet with a point spread or line that bettor's team would need to cover, if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event, such as the score of American football or the run line in baseball, or a series of action in the live event. Sportsbooks have a number of bets they can handle, a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half time bets. Additionally, the sportsbook can offer futures bets on live events 102 in the future. Sportsbooks need to offer payment processing services in order to cash out customers. This can be done at kiosks at the live event or at another location.

Further, embodiments may include a plurality of sensors 104 that may be used such as motion sensors, temperature sensors, humidity sensors, cameras such as an RGB-D camera which is a digital camera capable of capturing color (RGB) and depth information for every pixel in an image, microphones, radiofrequency receiver, a thermal imager, a radar device, a lidar device, an ultrasound device, a speaker, wearable devices etc. Also, the plurality of sensors may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that provides statistical information through real-time X, Y positioning of players and X, Y, Z positioning of the ball.

Further, embodiments may include a cloud 106 or communication network that may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over the Internet and relies on sharing of resources to achieve coherence and economies of scale, like a public utility, while third-party clouds allow organizations to focus on their core businesses instead of expending resources on computer infrastructure and maintenance. The cloud 106 may be communicatively coupled to wagering network 108 which may perform real time analysis on the type of play and the result of the play. The cloud 106 may also be synchronized with game situational data, such as the time of the game, the score, location on the field, weather conditions, and the like which may affect the choice of play utilized. For example, in other exemplary embodiments, the cloud may not receive data gathered from sensors 104 and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various exemplary embodiments herein.

Further, embodiments may include a wagering network 108 which may perform real time analysis on the type of play and the result of a play or action. The wagering network 108 (or cloud 106) may also be synchronized with game situational data, such as the time of the game, the score, location on the field, weather conditions, and the like which may affect the choice of play utilized. For example, in other exemplary embodiments, wagering network 108 may not receive data gathered from sensors 104 and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein. The wagering network can offer a number of software as a service managed services such as, user interface service, risk management service, compliance, pricing and trading service, IT support of the technology platform, business applications, game configuration, state based integration, fantasy sports connection, integration to allow the joining of social media, as well as marketing support services that can deliver engaging promotions to the user.

Further, embodiments may include a user database 110 which contains data relevant to all users of the system, which may include, a user ID of the user, a device identifier for their mobile device 126, a list of the players indicated as favorites by the user through the favorites module 120, and could also include wagering history on the user, and other relevant user data.

Further, embodiments may include an odds calculation module 112 which utilizes historical play data to calculate odds for in-play wagers.

Further, embodiments may include historical plays database 114, that contains play data for the type of sport being played in live event 102. For example, in American football for optimal odds calculation, the historical play data should include meta data about the historical plays, such as time, location, weather, previous plays, opponent, physiological data, etc.

Further, embodiments may include an odds database 116 that contains the odds calculated by the odds calculation module to display the odds the user's mobile device 126 and to take bets from the user through the mobile device wagering app 128.

Further, embodiments may include a historical wagering database 118 that contains data on wagers made by users in the past via the wagering app 128. For example, the database may include the amount wagered, the time of the wager, the type of sporting event or play wagered on, the odds of each wager selection, during which live event 102 the wager was made, etc.

Further, embodiments may include a recording database 120 that contains media recordings associated with significant wagers, for example, if a wager significance module 124 determines that a wager is significant, then the recording database 120 may contain a media recording of the live event 102 at the time of the wager, the user's reaction to making the wager, the user's reaction to the results of the wager, some other event related to the wager, or any combination of multiple media recordings.

Further, embodiments may include a base wagering module 122 that allows the user to log into the wagering network 108, view the selectable wagers, and make a wager, then the base wagering module 122 prompt the wagering significance module 124 to determine if the wager is significant, and if so begins to record the play from the live event 102 (or otherwise denote time of video that is significant), the wager data is stored in the historical wagering database 118 and the recording is stored in the recording database 120.

Further, embodiments may include a wager significance module 124 that determines if a wager meets the criteria to be considered significant, for example, a wager that is higher than any other the user has ever made is significant, a wager on a high-profile live event 102 such as a world championship is significant, a wager made after a streak of losses or wins is significant, etc.

Further, embodiments may include a mobile device 126 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. Some devices allow for voice recognition and inputs, including, e.g., Microsoft KINECT, SIRI for IPHONE by Apple, Google Now or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also contain storage and/or an installation medium for the computing device. In still other embodiments, the computing device may include USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fiber Channel bus, or a Thunderbolt bus. In some embodiments the mobile device 126 could be an optional component and would be utilized in a situation in which a paired wearable device is utilizing the mobile device 126 as additional memory or computing power or connection to the internet.

Further, embodiments may include a wagering app 128, which is a program that enables the user to place bets on individual plays in the live event 102, and display the audio and video from the live event 102, along with the available wagers on the mobile device 126. The wagering app 128 allows the user to interact with the wagering network 108 in order to place bets and provide payment/receive funds based on wager outcomes.

FIG. 2 illustrates the historical wagering database 118 which contains data on wagers made by users in the past via the wagering app 128. This data includes a user ID, for example, "bmarcus", a live game ID, for example, "2208072020", a wager ID, for example, "12", the amount wagered, for example, "$20", the outcome of the wager, for example, "win", and the time and date of the wager, for example, "8:49 PM 9/17/2020", in some embodiments additional data may be contained in the historical wagering database 118.

FIG. 3 illustrates the recording database 120 which contains media recordings associated with significant wagers, for example, if the wager significance module 124 determines that a wager is significant, then the recording database 120 may contain a media recording of the live event 102 at the time of the wager, the user's reaction to making the wager, the user's reaction to the results of the wager, some other event related to the wager, or any combination of multiple media recordings. The database contains the recording file, for example, "4893748508.MP4", and the number of the associated entry in the historical wager database 118, for example, "13688", in some embodiments the database may contain additional data.

FIG. 4 illustrates the base wagering module 122. The process begins with the base wagering module 122 being, at step 400, initiated by user login via the wagering app 128, login includes at least a user ID, in some embodiments login may include security credentials such as a password. For example, user Brandon Marcus is watching a football game and logins in with his username "bmarcus" in order to make wagers. The base wagering module 122 retrieves, at step 402, the available wagers for the current play of the live event 102 from the odds calculation module 112, in an embodiment wagers and odds may be retrieved from a third party. The base wagering module 122 displays, at step 404, the available wagers for the current play and the associated odds for each wager. The base wagering module 122 prompts, at step 406, the user to select one of the available wagers, in an embodiment this selection process may be facilitated by a GUI within the wagering app 128. The base wagering module 122 receives, at step 408, the user's selection of wager for the current play and the amount of money the user has wagered. For example, user Brandon Marcus is sure the next play is going to be a pass, he selects the wager option for "pass" and wagers $20. The base wagering module 122 prompts, at step 410, the wager significance module 124 with the collected data in order to determine if the wager is considered significant. The base wagering module 122 receives, at step 412, a determination from the wager significance module 124 on whether the wager is considered significant. If the wager is not significant, the base wagering module 122 skips to step 420. If the wager is significant, the base wagering module 122 begins, at step 414, recording the current play of the live event 102, in an embodiment the base wagering module may also begin recording the user via the mobile device 126. Further, upon the beginning or initiation of a recording, some indicia, such as a message or light which indicates a recording is being made, may be provided. The base wagering module 122 polls, at step 416, for completion of the current play of the live event 102. The base wagering module 122 stops, at step 418, recording the play once the play is completed and stores the recording in the recording database 120. Further, at this time, the indicia that a recording was being made may be removed or a message indicating that a recording has ended may be provided. The base wagering module 122 compares, at step 420, the actual results of the play of the live event 102 to the user's wager selection. For example, if user Brandon Marcus wagered that the next play would be a pass, and the play was in fact a pass, then the user won the wager. The base wagering module 122 adjusts, at step 422, the user's balance in the user database 110 based on whether the wager was won or lost, in an embodiment a third party will instead handle user balance and payments. The base wagering module 122 determines, at step 424, if the live event 102 is complete via data from the sensor feeds 104, in some embodiments the end of the live event may be manually determined or determined by another module. If the live event 102 is not complete, the base wagering module 122 returns, at step 424, to step 402. If the live event 102 is complete, the base wagering module 122 ends, at step 428.

In further embodiments, it may be understood that the making or generating of a recording may not be performed and, instead, a video file which has already been created and may be stored in a database or otherwise linked, may be utilized in any of the embodiments. For example, a video file stored in another database may have utilize timestamps associated with a beginning and end of a play. Further, any polling or determining of a start and end portion of a play may be done without a new recording being generated, locally or otherwise.

FIG. 5 illustrates the wager significance module 124. The process begins with the wager significance module 124 being, at step 500, prompted by the base wagering module 122. The wager significance module 124 receives, at step 502, the current wager from the base wagering module 122. For example, if user Brandon Marcus has made a wager that the next play will be a pass and has wagered $20, the wager significance module 124 will receive the ID of the live event 102 and play being wagered on, the wager option which is "pass", the user's ID which is "bmarcus", and the wager amount which is $20. The wager significance module 124 searches, at step 504, the historical wagering database 118 for entries that match the user ID of the logged-in user. The wager significance module 124 extracts, at step 506, the entries in the historical wagering database 118 that match the user ID of the logged-in user. The wager significance module 124 determines, at step 508, if the live event 102 is significant, a significant live event 102 would be a national or world championship, for example, the Super Bowl, or World Cup, in some embodiments these live events 102 may be compared to a database of significant live events in order to determine significance, in another embodiment significant live events 102 may have a different naming convention that indicates significance. In another embodiment the live event 102 may by significant if it involves the user's preferred player(s) or team(s). If the live event 102 is significant, the wager significance module 124 skips to step 518. For example, if user Brandon Marcus is watching an insignificant live event 102 then none of the wagers he makes during the game will determined to be significant at this step. The wager significance module 124 determines, at step 510, if the timing of the wager is significant by checking if this is the first wager made by the user during the live event 102, in some embodiments other timings may be considered significant, for example, the first bet after half time, the first bet of the season, a bet made within overtime, the last possible bet of the game, etc. If the timing of the wager is significant, the wager significance module 124 skips to step 518. For example, user Brandon Marcus makes two wagers during the football game he is watching, the first wager is made on the opening play of the game, the second wager is made on the 8th play of the game. The wager significance module would determine that the wager made on the first play is significant, while the wager made on the 8th play of the game is not significant at this step. The wager significance module 124 determines, at step 512, if the user won their last bet by searching for the extracted entry that is the most recent in time, in some embodiments a streak of wins or losses may be required to find a new wager is significant. If the user won their last bet, the wager significance module 124 skips to step 518. For example, user Brandon Marcus makes two wagers during the football game he is watching, the first wager is made on the opening play of the game, the second wager is made on the 8th play of the game. The wager significance module would determine that neither wager is significant because at least 3 wagers are required for a win or loss streak. The wager significance module 124 determines, at step 514, if the amount wagered is significant by checking if the current wager is the largest amount in the user's history, in some embodiments more than the maximum amount will be considered significant, for example, the top 10 amounts wagered, any wager above average, any wager above $100, any wager one standard deviation above average, etc. If the amount wagered is significant, the wager significance module 124 skips to step 518. For example, user Brandon Marcus makes two wagers during the football game he is watching, the first wager is made on the opening play of the game and, the second wager is made on the 8th play of the game. The first wager was for $20, and the second wager was for $5. User Brandon Markus rarely wagers more than $10, in fact his highest wager of all time was only $18. The wager significance module would determine that the wager made on the first play is significant, while the wager made on the 8th play of the game is not significant at this step. If none of the preceding criteria were met, the wager significance module 124 denotes, at step 516, that the wager is not significant, in some embodiments there may be more, less, or different criteria to determine significance. For example, user Brandon Marcus's second wager was not determined to be significant in steps 508, 510, 512, nor 514, therefore the second wager is not significant. If any of the preceding criteria were met, the wager significance module 124 denotes, at step 518, that the wager is significant, in some embodiments there may be more, less, or different criteria to determine significance. For example, user Brandon Marcus's first wager was determined to be significant in steps 510 and 514, therefore the first wager is significant. The wager significance module 124 returns, at step 520, to the base wagering module along with the determination on whether the wager was significant. Additionally, at this time or at any other time when a wager is determined to be significant, some indicia, such as a notification, audio notification, visual indicia, such as a red light, or other indicia may be provided to indicate that a wager is significant.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for providing a data file related to a play from a live event, comprising:

a data connection to a live event upon which wagers can be placed on actions;

a first database which stores wager history, a second database, an automatic determination that an action is designated for recording, and a data file generated and saved in the second database if the action is designated for recording, the data file comprising content associated with the action upon which the wager was placed.

2. The system for providing a data file related to a play from a live event of claim 1, wherein the automatic determination that an action is designated for recording is made when a wager is placed on the action.

3. The system for providing a data file related to a play from a live event of claim 2, further comprising a second data file containing audio and/or video data related to a user who placed the wager.

4. The system for providing a data file related to a play from a live event of claim 3, further comprising generating a third data file comprising a combination of the first data file and the second data file.

5. The system for providing a data file related to a play from a live event of claim 1, further comprising a link to the data file is generated following the saving of the data file in the second database.

6. The system for providing a data file related to a play from a live event of claim 4, wherein the link to the data file comprises a link to a timestamp in the data file.

7. The system for providing a data file related to a play from a live event of claim 1, further comprising generating a notification when the data file is generated.

8. The system for providing a data file related to a play from a live event of claim 1, wherein the data file includes a recording of the play upon which the wager was placed.

9. The system for providing a data file related to a play from a live event of claim 1, wherein the data file includes a video.

* * * * *